(12) United States Patent
Moyer et al.

(10) Patent No.: US 6,378,022 B1
(45) Date of Patent: Apr. 23, 2002

(54) METHOD AND APPARATUS FOR PROCESSING INTERRUPTIBLE, MULTI-CYCLE INSTRUCTIONS

(75) Inventors: William C. Moyer, Dripping Springs; Jeffrey W. Scott; Michael D. Fitzsimmons, both of Austin, all of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/335,105

(22) Filed: Jun. 17, 1999

(51) Int. Cl.[7] .............................. G06F 13/24; G06F 9/30
(52) U.S. Cl. ..................... 710/260; 712/221; 712/244
(58) Field of Search ................................ 710/260–269; 712/220–248

(56) References Cited

U.S. PATENT DOCUMENTS

| | | | | |
|---|---|---|---|---|
| 4,312,066 A | * | 1/1982 | Bantz et al. | 714/30 |
| 4,504,903 A | * | 3/1985 | Dickman | 710/260 |
| 5,535,380 A | * | 7/1996 | Bergkvist, Jr. | 713/502 |
| 5,794,062 A | * | 8/1998 | Baxter | 712/30 |
| 5,889,973 A | | 3/1999 | Moyer | 395/376 |
| 6,178,499 B1 | * | 1/2001 | Stotzer et al. | 712/241 |
| 6,286,346 B1 | * | 9/2001 | Hocken, Jr. et al. | 70/260 |

OTHER PUBLICATIONS

Motorola, Inc. 1992, M68020 User's Manual, Section 7, "Coprocessor Interface Description", pp. 7–1—7–60.
Intel Pentium Processor Family Developer's Manual vol. 3: Architecture and Programming Manual, 1995, pp. 25/224–233 & 25/266–269.*

* cited by examiner

*Primary Examiner*—Sumati Lefkowitz
(74) *Attorney, Agent, or Firm*—Susan C. Hill; Joanna G. Chiu

(57) ABSTRACT

A method and apparatus for processing multi-cycle instructions. In one embodiment, the method includes beginning execution of a multi-cycle instruction by the processing device, and, during execution of the multi-cycle instruction, comparing a threshold value to a count value that indicates a number of remaining cycles before completion of the multi-cycle instruction. In one embodiment, the apparatus includes a processing unit. The processing unit includes an interrupt control module that has an interrupt request signal input and a second input to receive a multi-cycle instruction interrupt signal. The multi-cycle instruction interrupt signal is to indicate an interruptible interval when an interrupt of a multi-cycle instruction is permitted prior to completion of the multi-cycle instruction.

42 Claims, 7 Drawing Sheets

METHOD AND APPARATUS FOR PROCESSING INTERRUPTIBLE, MULTI-CYCLE INSTRUCTIONS

CROSS-REFERENCE TO RELATED APPLICATION

The present application is related to U.S. Pat. No. 5,889,973, issued Mar. 30, 1999 to William C. Moyer et al., and assigned to Motorola, Inc., and which is hereby incorporated herein by reference in its entirety.

FIELD OF THE INVENTION

The present invention relates in general to a method and apparatus that perform data processing, and, more particularly, to a method and apparatus for processing multi-cycle instructions that may be interrupted during execution.

BACKGROUND

Interrupts are commonly used in data processing systems. For example, interrupts are especially important in many real-time control applications to allow a data processing system to quickly respond to real-time events. The time required for a data processing system to respond to an interrupt is the interrupt latency of the data processing system. A short interrupt latency time allows quick response to interrupts, but may reduce throughput of a data processing system. A long interrupt latency time slows response to interrupts, but may increase throughput of the data processing system. In most data processing systems, it is desirable to have the shortest possible interrupt latency time without reducing the normal operating performance of the data processing system.

Interrupt latency is typically affected by the timing of processor clock boundaries where interrupts are typically sampled. These boundaries occur at the completion of one instruction and the beginning of the next instruction. Multi-cycle instructions increase latency in a data processing system because instruction completion may take many cycles, thereby postponing a boundary where interrupts are sampled. Examples of such instructions are multiply, divide, move multiple memory items and fuzzy logic instructions. The time required to finish executing such instructions before responding to a pending interrupt request may cause the interrupt latency of a data processing system to be too long. The maximum amount of time required for a data processing system to respond to an interrupt, often the time for execution of the longest multi-cycle instruction, determines a data processing system's "maximum interrupt latency time".

In most data processing systems, it is desirable to minimize the time a data processing system takes to respond to an interrupt. For example, a data processing system which is controlling an automobile engine may receive an interrupt request from the anti-lock braking system when the anti-lock braking system detects that the automobile has entered a skid. In many real-time control applications, a reduction of the maximum interrupt latency time is not only desirable, but also may determine which data processing system is chosen for a particular application. In the example above, if the engine control system cannot respond fast enough to the interrupt from the anti-lock braking system, another data processing system with a shorter interrupt latency time will often be chosen and used.

It is thus very desirable in the data processing field to reduce the maximum interrupt latency time without significantly reducing the normal operating performance of the data processing system. However, many prior systems that reduce interrupt latency also reduce processor throughput. The need to reduce interrupt latency must be balanced with the need to maximize data throughput of a data processing system. Accordingly, there is a need for an improved method and apparatus for processing instructions to reduce or minimize latency while minimally reducing or maintaining processor throughput.

BRIEF DESCRIPTION OF THE DRAWINGS

At least one illustrative embodiment is disclosed in the following text and the accompanying drawings.

DETAILED DESCRIPTION

The following is intended to provide a detailed description of at least one example of the invention and should not be taken to be limiting of the invention itself. Rather, any number of variations may fall within the scope of the invention which is defined in the claims following the description.

Based on the teachings herein, multi-cycle instructions may be processed so that such instructions are capable of interruption during execution in a manner that facilitates reduction of interrupt latency and that facilitates data processing throughput. For example, the execution of a long instruction may be interrupted during certain intervals of the execution of the long instruction in order to process an interrupt request. The use of interrupt intervals during instruction execution reduces and/or minimizes interrupt latency while maximizing throughput during such interruptible operation.

In one embodiment, a data processing unit calculates (e.g., counts, reads or otherwise determines) the remaining number of execution clocks for a particular operation. If the remaining number of clocks is less than a predetermined or programmable, post-threshold value or interval, the instruction is almost complete, and interrupt recognition for the particular operation is postponed until the next instruction boundary. Because the instruction is allowed to complete prior to processing the interrupt, data is not lost due to the interrupt, and the instruction need not be re-executed after the interrupt is processed. If the remaining number of clocks is greater than the post-threshold interval, the instruction is not almost complete, and interrupts are recognized during execution of the instruction. Because the instruction is interruptible prior to the post-threshold interval, interrupt latency may be limited to the length of the post-threshold interval instead of the length of the long instruction. Accordingly, interrupt latency and processor re-execution overhead are both optimized based on the teachings herein.

Figure 1:
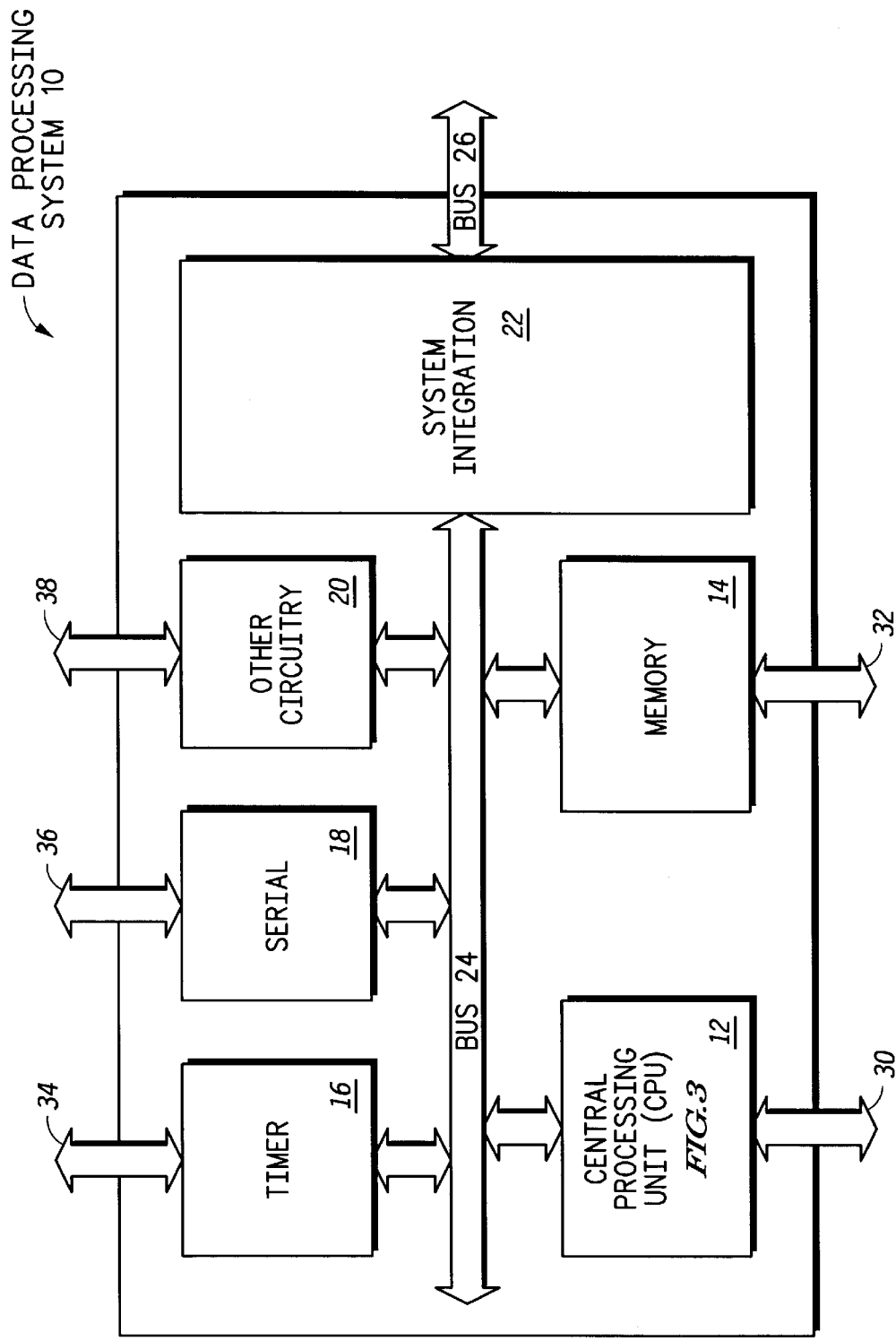
FIG. 1 illustrates, in block diagram form, a data processing system.

FIG. 1 illustrates a data processing system 10 including central processing unit (CPU) circuitry 12, memory circuitry 14, timer circuitry 16, serial circuitry 18, other circuitry 20, and system integration circuitry 22, which are all bi-directionally coupled to each other by way of bus 24. As indicated in FIG. 1, CPU 12 is further described hereinafter with reference to FIG. 3.

CPU 12 may be coupled external to data processing system 10 by way of one or more integrated circuit terminals 30. Memory 14 may be coupled external to data processing system 10 by way of one or more integrated circuit terminals 32. Timer 16 may be coupled external to data processing system 10 by way of one or more integrated circuit terminals 34. Serial circuitry 18 may be coupled external to data processing system 10 by way of one or more integrated circuit terminals 36. System integration circuitry 22 is bi-directionally coupled external to data processing system 10 by way of bus 26.

Figure 2:
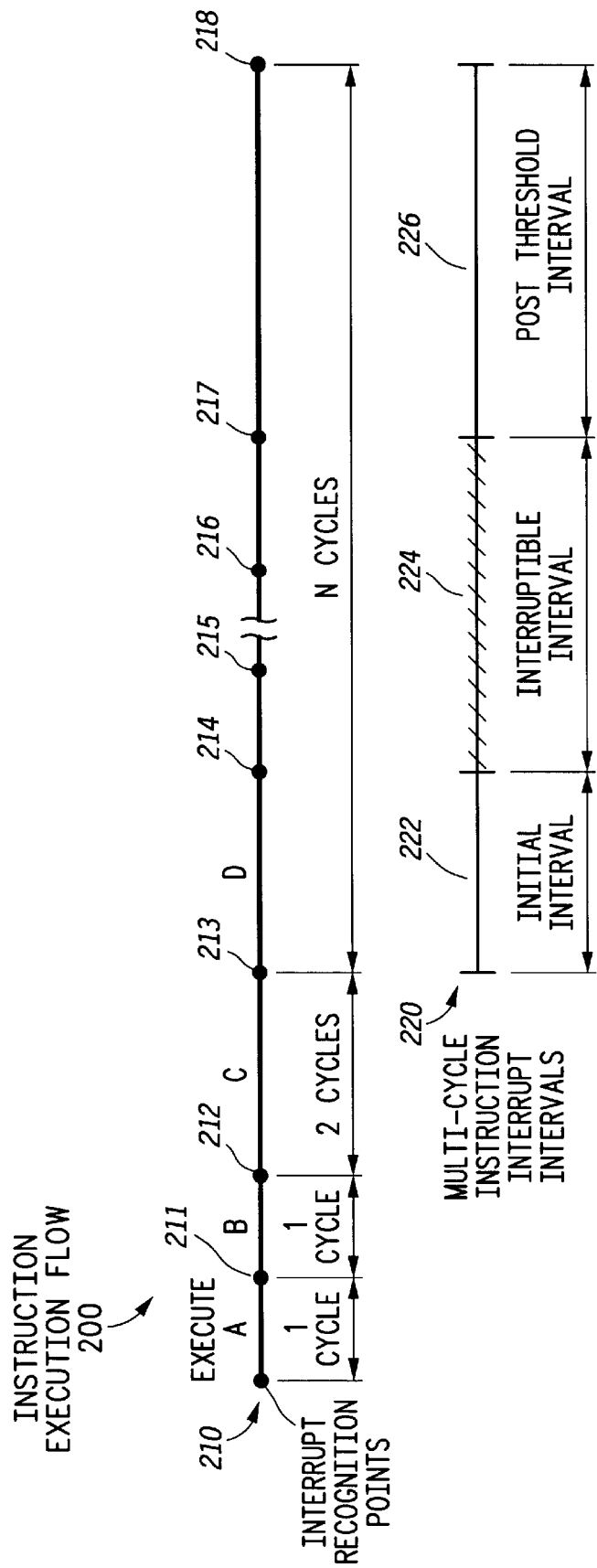
FIG. 2 illustrates an instruction execution timing diagram.

FIG. 2 shows an instruction execution flow 200 of data processing system 10. Instruction execution flow 200 includes sequentially executing instructions A, B, C and D. Instructions A and B are single cycle instructions. Instruction C is a multi-cycle instruction of two cycles. Instruction D is a multi-cycle instruction of N cycles where, for example, N>2, or even N>>2. For example, instruction D may be an iterative instruction such as a floating point divide instruction requiring as many as 38 clocks or more to execute. Other multi-cycle instructions often require 16 or more clocks to execute.

Instruction execution flow 200 includes various interrupt recognition points 210 including interrupt recognition points 211, 212, 213, 214, 215, 216, 217 and 218. Interrupt recognition points 210 represent various points in the execution of instructions A–D at which data processing system 10 can recognize and process an interrupt. When an interrupt is received, data processing system 10 must wait for an interrupt recognition point to recognize and process the interrupt. When an interrupt is received and recognized, execution of instructions in instruction flow 200 is halted at the next interrupt recognition point, and an interrupt handling routine is selected and executed. Execution of instructions is then restarted beginning after the last fully executed instruction.

FIG. 2 also shows execution intervals 220. Execution intervals 220 include initial interval 222, interruptible interval 224 and post-threshold interval 226. Initial interval 222 is a set-up interval during which instruction D or other instructions may not be interrupted. Instruction D must complete initial interval 222 before being interrupted. Interruptible interval 224 is an interval during which instruction D may be interrupted as demonstrated by interrupt recognition points 214, 215, 216 and 217. Post-threshold interval 226 is an interval during which instruction D may not be interrupted. Once instruction D enters post-threshold interval 226, instruction D must complete execution before being interrupted.

Thus, multi-cycle instruction D is interruptible during interruptible interval 224 while instruction D is executing to decrease interrupt latency of data processing system 10, but multi-cycle instruction D is not interruptible during post-threshold interval 226 when instruction D is close to completion. By preventing an interrupt of instruction D during post-threshold interval 226, the throughput of data processing system 10 is not unduly impacted by an interrupt causing termination of instruction D, thereby causing an attendant loss of often almost complete data. Execution intervals 222, 224, and 226 are further described hereinafter with reference to FIGS. 3–8.

Figure 3:
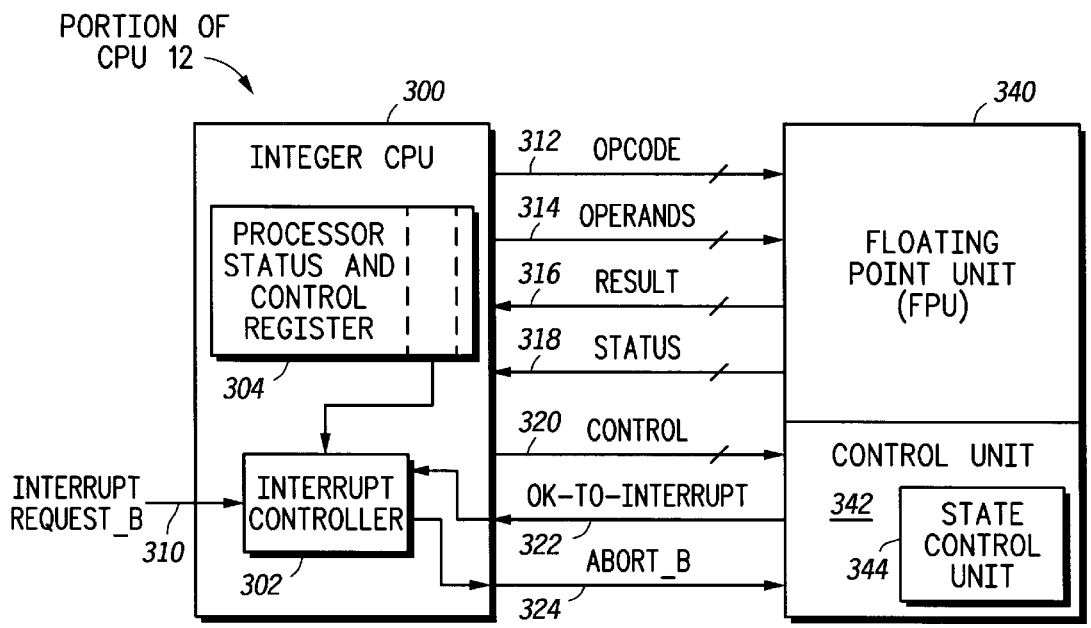
FIG. 3 illustrates, in block diagram form, a portion of a central processing unit (CPU) of the data processing system of FIG. 1.

FIG. 3 illustrates a portion of CPU 12. CPU 12 includes integer CPU 300 and floating point unit (FPU) 340. Integer CPU 300 is coupled to FPU 340 via opcode bus 312, operands bus 314, result bus 316, status bus 318, and control bus 320. Integer CPU 300 is further coupled to FPU 340 via OK_TO_INTERRUPT signal 322 and ABORT_B signal 324. Integer CPU 300 is coupled to receive interrupt request 310 of data processing system 10.

Integer CPU 300 includes processor status and control register 304 and interrupt controller 302. Processor status and control register 304 is a storage location coupled to provide an interrupt enable control bit and interrupt mask control bits to interrupt controller 302. The interrupt enable control bit indicates whether or not interrupts are enabled, and the interrupt mask control bits indicate whether or not a received interrupt is masked. Interrupt controller 302 is an interrupt control module which is coupled to receive OK_TO_INTERRUPT signal 322 and interrupt request 310, and which is coupled to provide ABORT_B signal 324.

Floating point unit 340 includes control unit 342. Control unit 342 includes state control unit 344. State control unit 344 is coupled to receive ABORT_B signal 324 and is coupled to provide OK_TO_INTERRUPT signal 322. State control unit 344 is further discussed hereinafter with reference to FIG. 4.

During operation, floating point unit 340 receives instructions (e.g., an instruction execution flow) from integer CPU 300 via opcode bus 312. In accordance with the received instructions, floating point unit 340 performs various operations on operands received via operands bus 314. Floating point unit 340 provides results and status information via result bus 316 and status bus 318, respectively.

A handshake protocol is used between integer CPU 300 and floating point unit 340 to control interruption of instructions being executed by floating point unit 340. The handshake protocol allows floating point unit 340 to indicate an optimal interrupt recognition window to integer CPU 300. Floating point unit 340 interrupts an instruction execution flow at the next interrupt recognition point after floating point unit 340 receives ABORT_B signal 324 from integer CPU 300. Floating point unit 340 indicates to integer CPU 300 when floating point unit 340 is ready to receive ABORT_B signal 324 by asserting OK_TO_INTERRUPT signal 322. For example, in one embodiment, OK_TO_INTERRUPT signal 322 is asserted by floating point unit 340 during execution of one-cycle instructions and during interruptible intervals 224 of multi-cycle instructions. If OK_TO_INTERRUPT signal 322 is not asserted, floating point unit 340 will not receive an ABORT_B signal 324 and will not interrupt the instruction execution flow.

Figure 4:
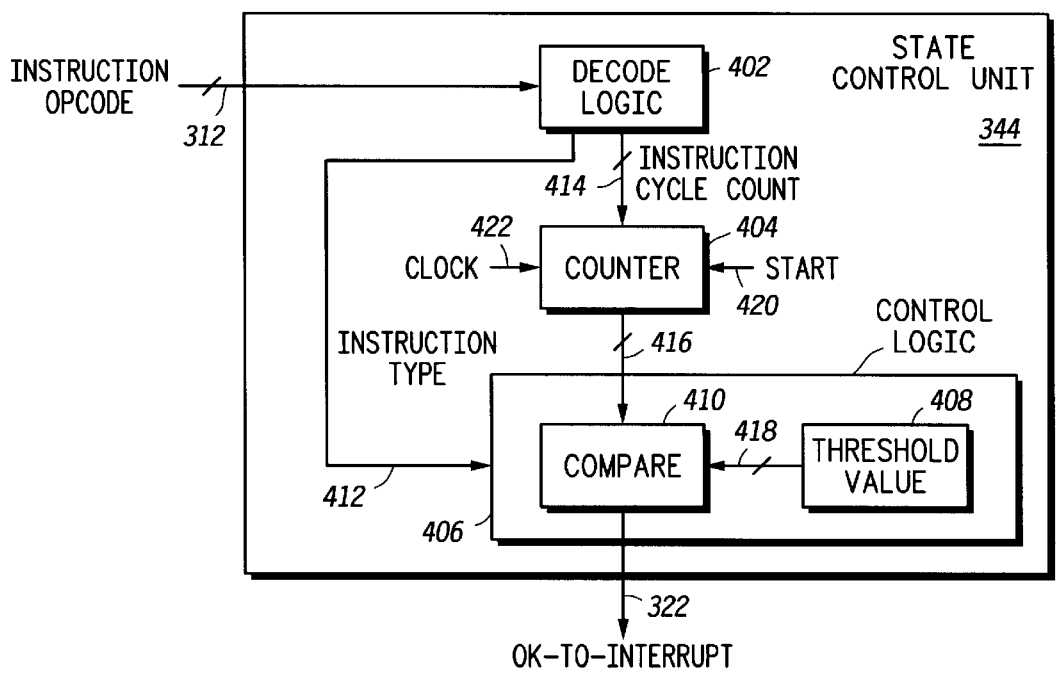
FIG. 4 illustrates, in block diagram form, a portion of a floating point unit (FPU) of the data processing system of FIG. 1.

As shown in FIG. 4, state control unit 344 includes decode logic 402, counter 404 and control logic 406. Control logic 406 includes compare block 410 and threshold value 408. Decode logic 402 is a decode module which is coupled to receive an instruction via opcode bus 312. Decode logic 402 is coupled to provide instruction cycle count 414 to counter 404. Decode logic 402 is further coupled to provide instruction type signal 412 to control logic 406. Counter 404 is a count module which is coupled to receive instruction cycle count 414, clock 422 and start signal 420. Counter 404 may be, for example, any counter typically used for iterative instructions and is not necessarily additional logic to data processing system 10. Counter 404 is coupled to provide a counter value signal via bus 416 to compare block 410. Compare block 410 is coupled to receive the counter value signal via bus 416 and threshold value 408 via bus 418. Compare block 410 is coupled to provide OK_TO_INTERRUPT signal 322.

Figure 5:
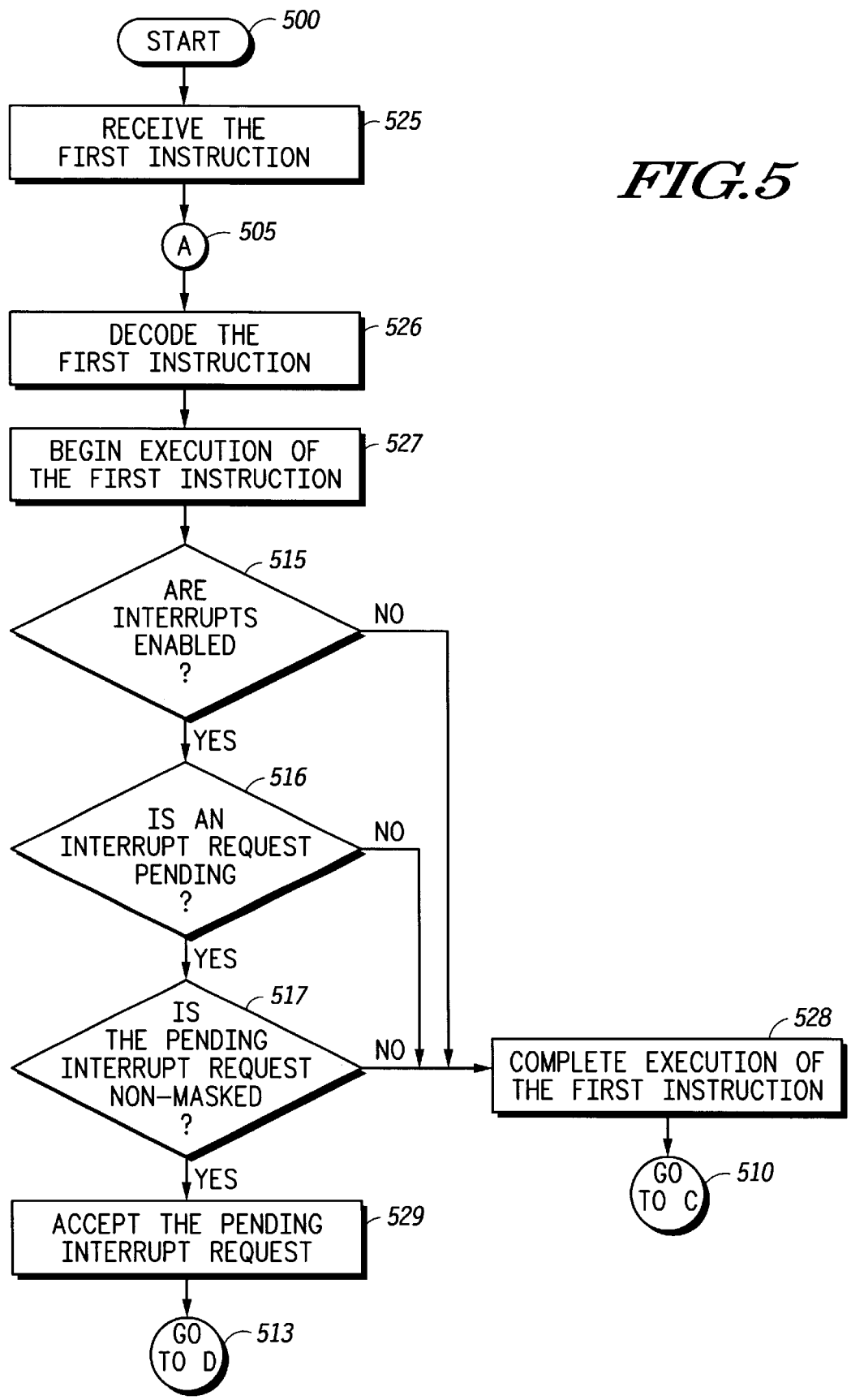
FIG. 5 illustrates, in flow diagram form, a method to control interrupt latency in a data processing system.

Referring to FIGS. 3 and 4 and operation 525 in FIG. 5, state control unit 344 receives a first instruction by way of instruction opcode bus 312. The first instruction may be any instruction which data processing system 10 is capable of executing. The first instruction may be an instruction in a primary program, in a subroutine, in an interrupt processing routine, or in any other computer program. After operation 525 and during operation 526, decode logic 402 decodes the first instruction and provides an instruction cycle count to counter 404 via bus 414. After operation 526 and during operation 527, control unit 342 initiates execution of the first instruction.

After operation 527 and during decision 515, integer CPU 300 determines whether any device (not shown) external to data processing system 10 is requesting an interrupt and determines whether any circuitry (e.g. 16, 18, or 20 in FIG. 1) internal to data processing system 10 is requesting an interrupt. Interrupt controller 302 receives an interrupt enable control bit from processor status and control register 304 and determines whether or not interrupts are enabled.

If interrupts are not enabled, integer CPU 300 receives no interrupt request and execution of the first instruction completes without interruption in the normal manner during operation 528. After operation 528 and during operation 635 (shown in FIG. 6), instruction execution then continues with the fetching, receiving, decoding, and executing of the next instruction.

If interrupts are enabled, control transitions from decision 515 to decision 516. During decision 516, interrupt controller 302 checks interrupt request 310 to determine if any interrupt request has been received and is pending. If no interrupt request has been received by integer CPU 300, execution of the first instruction completes without interruption in the manner described above with reference to operations 528 and 635. If an interrupt request has been received, control transitions from decision 516 to decision 517.

During decision 517, if an interrupt request has been received and is pending, interrupt controller 302 receives interrupt mask control bits from processor status and control register 304 and determines whether or not the received interrupt is masked. The masking of interrupts is well known in the data processing art. If the interrupt is masked, for example because the received interrupt has a priority level below a threshold priority determined by the interrupt mask control bits, then execution of the first instruction completes without interruption in the manner described above with reference to operations 528 and 635.

If, however, the pending interrupt request is not masked, for example because the received interrupt has a priority level above a threshold priority determined by the interrupt mask control bits, then the interrupt request is accepted during operation 529, and integer CPU 300 is interrupted by interrupt controller 302. Control then transitions from operation 529 to decision 618.

Figure 6:
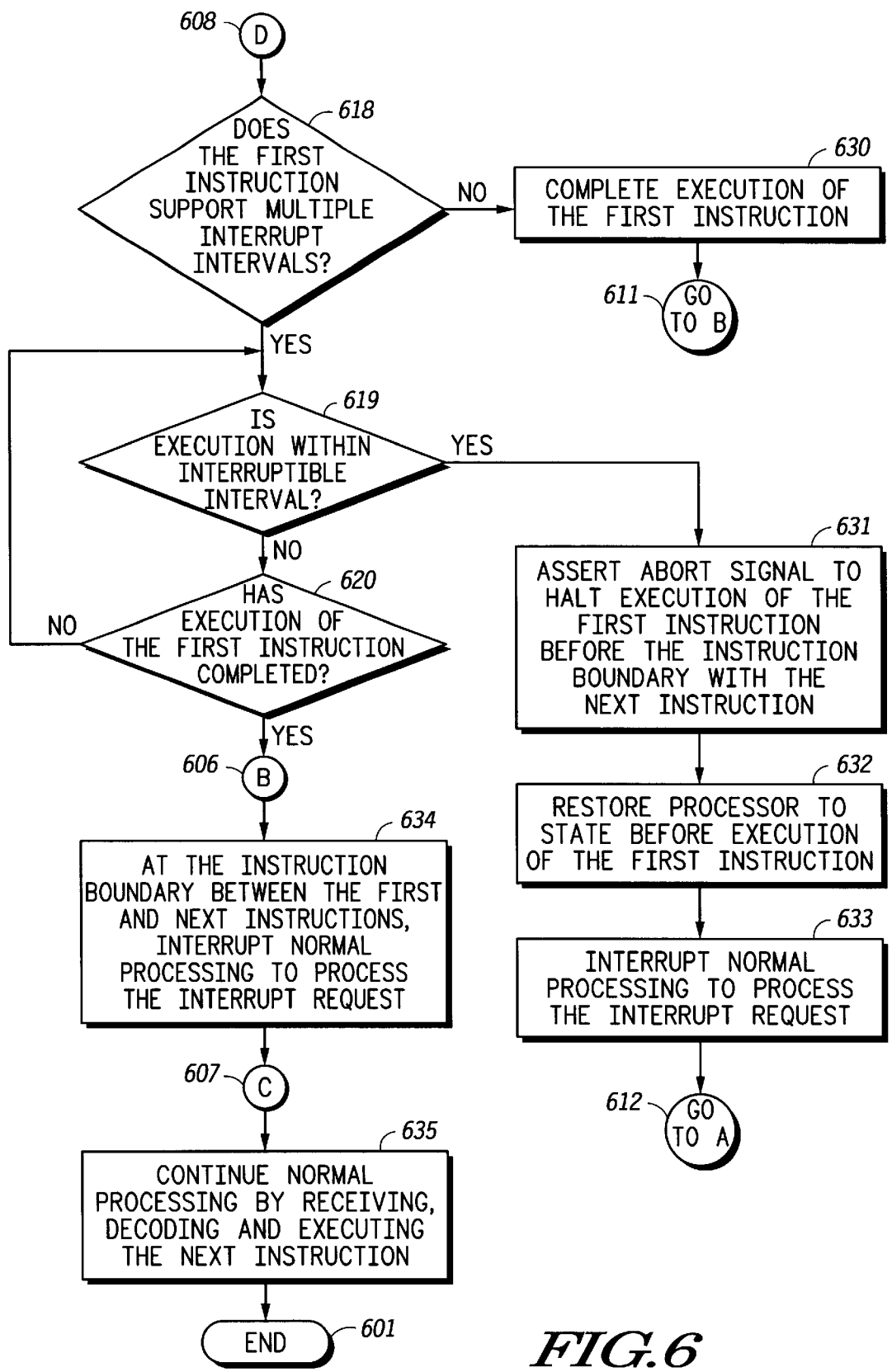
FIG. 6 illustrates, in flow diagram form, a method to control interrupt latency in a data processing system.

Referring to FIG. 6, the floating point unit 340 determines whether the first instruction supports multiple interrupt intervals during decision 618. If the first instruction does not support multiple interrupt intervals, execution of the first instruction completes without interruption during operation 630. The interrupt request is then processed at the instruction boundary between the first instruction and the next instruction during operation 634. Finally, normal instruction execution continues with the fetching, receiving, decoding, and executing of the next instruction during operation 635.

If the first instruction is determined to support multiple interrupt intervals during decision 618, floating point unit 340 determines whether the currently executing cycle of the first instruction is within an interruptible interval during decision 619. If the currently executing cycle is not within an interruptible interval, floating point unit 340 determines whether execution of the first instruction has completed during decision 620. If execution of the first instruction has not completed, control transitions to decision 619 to determine whether the next executing clock cycle is within an interruptible interval.

If during decision 619, floating point unit 340 determines that the currently executing cycle of the first instruction is within an interruptible interval, floating point unit 340 asserts OK_TO_INTERRUPT signal 322. Responsive to the OK_TO_INTERRUPT signal 322 being asserted, interrupt controller 302 (FIG. 3) asserts ABORT_B signal 324, and floating point unit 340 halts execution of the first instruction at the next interrupt recognition point (e.g., before the next clock cycle) during operation 631. Thus, interrupt processing is not postponed while the first instruction finishes execution if the interrupt is received during an interruptible interval, thereby reducing interrupt latency.

In one embodiment, the partial results of the first instruction are discarded and the data processing system 10 is returned to the same state the data processing system 10 had before the execution of the first instruction began upon completion of processing of the interrupt during operation 632. The interrupt request is processed before the instruction boundary between the first instruction and the next instruction during operation 633. After processing of the interrupt request has completed, the data processing system 10 will re-decode and re-execute the first instruction during operation 526 because execution of the first instruction has not completed.

If, during decision 620, floating point unit 340 determines that execution of the first instruction has completed, then the interrupt request is processed at the instruction boundary between the first instruction and the next instruction during operation 634, and instruction execution continues with the fetching, receiving, decoding, and executing of the next instruction during operation 635.

Figure 7:
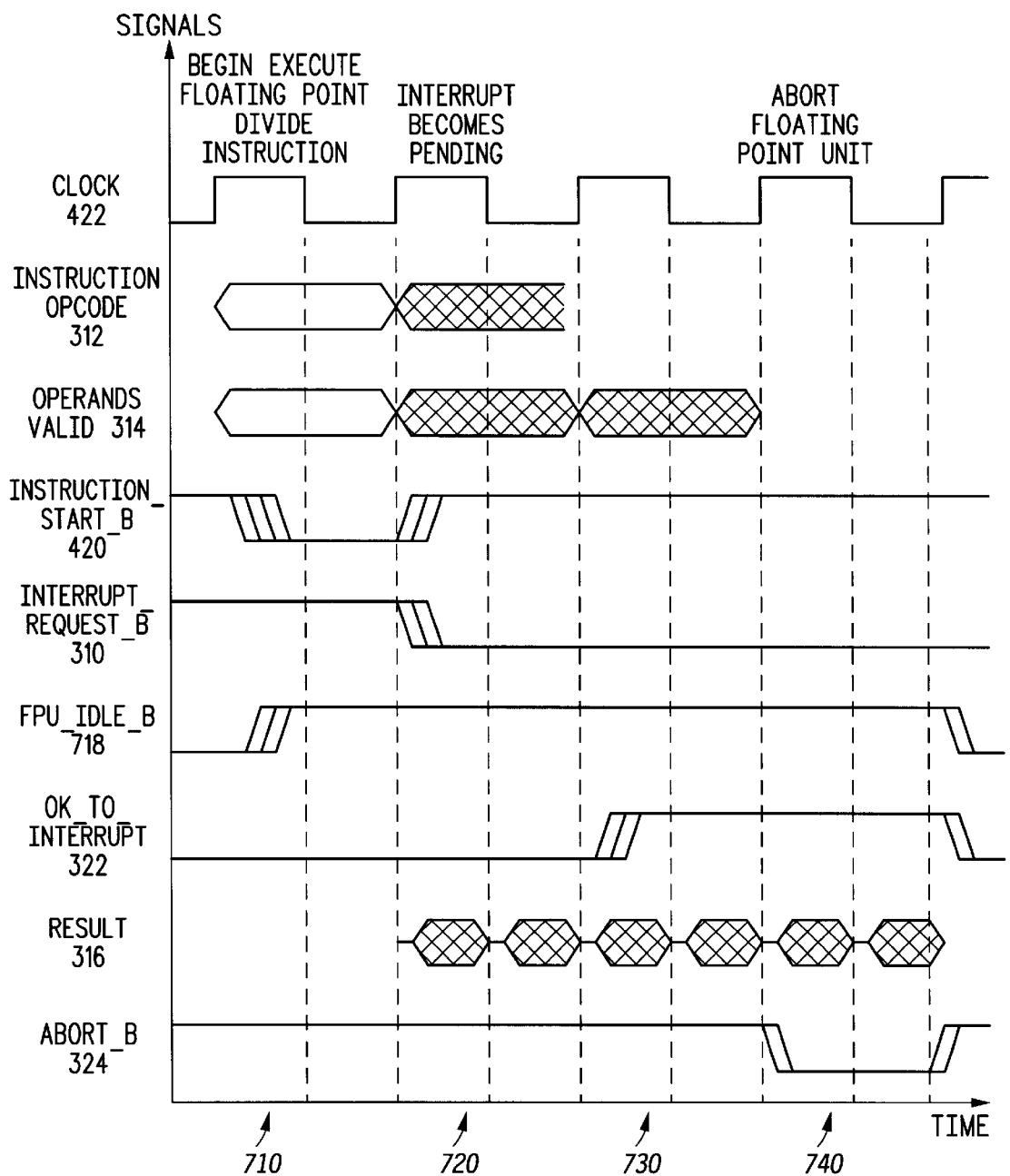
FIG. 7 illustrates a timing diagram showing the operation of the data processing system of FIG. 1.

Referring to FIG. 7, a timing diagram shows the execution of an exemplary multi-cycle instruction by data processing system 10. In the particular illustrated example, the multi-cycle instruction is a floating point division operation. Also in the particular illustrated example, the OK_TO_INTERRUPT signal 322 is active when in the high state, and INSTRUCTION_START_B signal 420, INTERRUPT_REQUEST_B signal 310, floating point unit idle FPU_IDLE_B signal 718, and ABORT_B signal 324 are active when in the low state.

At time 710, execution of a floating point divide instruction is initiated. Floating point unit 340 receives a floating point divide instruction operation code (opcode) via bus 312 and valid operands via bus 314. INSTRUCTION_START_B signal 420 (see FIG. 4) is asserted low within state control unit 344, and FPU_IDLE_B signal 718 (which is included in status signal 318) is negated high to indicate that floating point unit 340 has begun execution of the first instruction. In the present example, the OK_TO_INTERRUPT signal 322 is not asserted (e.g., not high) during an initial interval 222 at times 710 and 720 to prevent interruption of the execution of the first instruction during an instruction setup time. The need, if any, for an initial interval 222 is embodiment specific.

At time 720, INTERRUPT_REQUEST_B signal 310 is asserted low to indicate that an interrupt is pending. At time 730, OK_TO_INTERRUPT signal 322 is asserted high to indicate termination of the initial interval 222 and initiation of the interruptible interval 224. Responsive to the OK_TO_INTERRUPT signal 322 being asserted and responsive to the INTERRUPT_REQUEST_B signal 310 having already been asserted, interrupt controller 302 asserts ABORT_B signal 324 at time 740. Responsive to ABORT_B signal 324 being asserted low, floating point unit 340 interrupts the floating point division operation at the next interrupt recognition point (e.g., the next clock cycle in the interruptible interval) and returns to an idle state as indicated by FPU_IDLE_B signal 718 being asserted low after time 740. Additionally, OK_TO_INTERRUPT signal 322 is negated low. No results are reported via result bus 316 as a result of the interruption of the first instruction.

Figure 8:
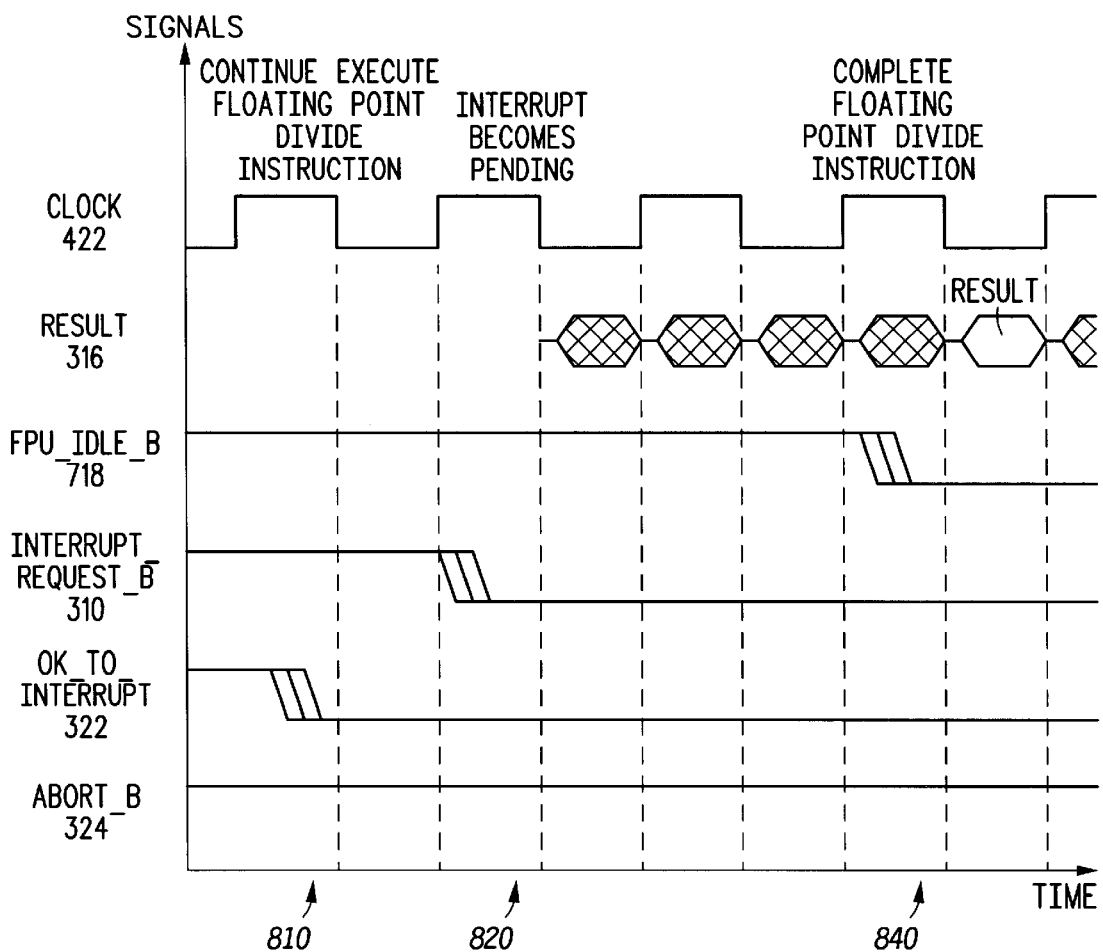
FIG. 8 illustrates a timing diagram showing the operation the data processing system of FIG. 1.

Referring to FIG. 8, a timing diagram shows the execution of an exemplary multi-cycle instruction by data processing system 10. In the particular illustrated example, the multi-cycle instruction is a floating point division operation. Also in the particular illustrated example, the OK_TO_INTERRUPT signal 322 is active when in the high state, and FPU_IDLE_B signal 718, INTERRUPT_REQUEST_B signal 310, and ABORT_B signal 324 are active when in the low state.

At 810, when the floating point division operation is being executed, the FPU_IDLE_B signal 718 is high indicating that floating point unit 340 is not idle, the INTERRUPT_REQUEST_B signal 310 is high indicating no pending interrupts, the OK_TO_INTERRUPT signal 322 is high indicating that the division instruction is in an interruptible interval where the division operation may be interrupted, and the ABORT_B signal 324 is high indicating that it is not active. At time 820, when an interrupt becomes pending, INTERRUPT_REQUEST_B signal 310 is asserted, but the OK_TO_INTERRUPT signal 322 has transitioned to the low state indicating that the instruction may not be interrupted prior to its completion. Thus, the ABORT_B signal 324 is not asserted and the division operation is completed at time 840. A result is produced via the result bus 316 upon completion of the division instruction at time 840.

In the illustrated example, the division operation was very near completion and by not allowing the division operation to be interrupted prior to its completion, the processing time used by the floating point unit 340 was not wasted, thereby resulting in increased processing throughput. In this particular example, OK_TO_INTERRUPT signal 322 was changed to the low state when the division operation came within three clock cycles of completing. The threshold value that determines assertion of OK_TO_INTERRUPT signal 322 had a value of three clock cycles. Thus, division instructions that are within three clock cycles of being completed may not be interrupted prior to completion, but division instructions that have more than three cycles left before completion may be interrupted. In this manner, the maximum latency of the processor has a low value, e.g. three clock cycles, which is beneficial for real-time response, and the processor has improved processing bandwidth.

In one embodiment, data processing system 10 includes interruptible and non-interruptible instructions. That is, data processing system 10 allows the option of causing interrupt recognition to occur in mid-instruction if appropriate for the processing environment and/or the instruction being executed. When an instruction is interrupted in mid-execution, the partial results of an instruction are discarded, and the pending interrupt is processed. The threshold value is used to prevent loss of data from substantially completed instructions. In one embodiment, the threshold value is selected to be the maximum latency of the system which is the longest non-interruptible instruction. For example, if the longest non-interruptible instruction is 4 clock cycles, a threshold value of 4 may be chosen so as not to increase the maximum latency of data processing system 10. Use of the threshold value prevents loss of data from substantially completed instructions without increasing the maximum interrupt latency time of data processing system 10.

In one embodiment, a method of processing instructions by a processing device is provided. The processing device begins execution of a multi-cycle instruction. During execution of the multi-cycle instruction, a threshold value is compared to a count value that indicates a number of remaining cycles before completion of the multi-cycle instruction.

In one embodiment, an apparatus includes a processing unit. The processing unit includes an interrupt control module. The interrupt control module has an interrupt request signal input and a second input to receive a multi-cycle instruction interrupt signal to indicate whether the multi-cycle instruction is within an interruptible interval where an interrupt of a multi-cycle instruction is permitted prior to completion of the multi-cycle instruction.

In one embodiment, a data processing unit includes an execution unit. The execution unit is configured to process a multi-cycle instruction. The execution unit includes decode logic, a counter, a threshold value and a comparison unit. The decode logic is coupled to receive an instruction operation code. The counter is responsive to the decode logic to receive an instruction cycle count. The comparison unit is responsive to the counter and to the threshold value. The comparison unit has an output to produce a multi-cycle instruction interrupt signal to indicate an interruptible interval when an interrupt of the multi-cycle instruction is permitted.

In one embodiment, a multi-cycle instruction for processing data includes first and second execution intervals. The first execution interval permits interruption prior to completing execution of the multi-cycle instruction. The second execution interval indicates completion of the multi-cycle instruction prior to interruption.

In one embodiment, an apparatus includes a signal. The signal includes a first signal value and a second signal value. During execution of a multi-cycle instruction, the first signal value indicates that the multi-cycle instruction is at a first execution point where the multi-cycle instruction may be interrupted prior to completion. Also during execution of the multi-cycle instruction the second signal value indicates that the multi-cycle instruction is at a second execution point where the multi-cycle instruction is to be completed prior to interruption.

In one embodiment, a computer program product is encoded in computer readable media. The computer program product includes a first instruction. The first instruction is executable on a computer system. The first instruction is for executing a multi-cycle operation. The first instruction includes first and second execution intervals. The first execution interval permits interruption prior to completing execution of the multi-cycle instruction, and the second execution interval indicates completion of the multi-cycle instruction prior to interruption.

In one embodiment, an apparatus for processing data includes a computer-readable medium and a multi-cycle instruction. The multi-cycle instruction is stored on the computer-readable medium. The multi-cycle instruction includes first and second execution intervals. The first execution interval permits interruption prior to completing execution of the multi-cycle instruction, and the second execution interval indicates completion of the multi-cycle instruction prior to interruption.

While one or more embodiments are described herein, it will be understood that such embodiments are illustrative of the invention and that the scope of the invention is not limited to them. Rather, the scope of the invention is defined in the claims that follow this detailed description. Thus, other embodiments of the invention include various modifications, additions, and/or improvements to the embodiments discussed herein.

The foregoing components, devices, operations, etc., are used herein as examples for the sake of conceptual clarity. For example, data processing unit 10 and/or CPU 12 are utilized as an exemplar of any processing unit, including but not limited to a data processor which is formed on a single integrated circuit, a single chip microcontroller or a multi-processor unit. Data processing system 10 and the components thereof may be implemented using any type of electrical circuitry or any type of unit or module (software, hardware, firmware or otherwise) for performing and/or simulating the functionality and/or structure thereof. Consequently, as used herein these specific exemplars are intended to be representative of their more general classes. Furthermore, in general, the use of any specific exemplar in the detailed description is also intended to be representative of its class and the non-inclusion of such specific devices in the foregoing list should not be taken as indicating that limitation is desired.

Integrated circuit terminals 30, 32, 34, 36 and 38 may be any type of apparatus which allows electrical signals to be transferred to or from data processing system 10. For example, integrated circuit terminals 30, 32, 34, 36 and 38 may be integrated circuit pins, solder bumps, wire conductor, etc. In addition, bus 26 may conduct electrical signals to and from data processing system 10 by way of integrated circuit terminals.

In one embodiment, the threshold value described above is fixed or hard-wired to a particular value. In another embodiment, the threshold value is user or system programmable and may change based on system environmental changes or user requirements, for example. In one embodiment, the threshold is optionally enabled or disabled, by setting an enable flag for example.

In one embodiment, the handshake protocol for optimizing interrupt latency and processor execution overhead is implemented between integer CPU 300 and floating point unit 340. In other embodiments, the handshake protocol is implemented between any of a variety of functional units to indicate an optimal interrupt window.

Those skilled in the art will recognize that the boundaries between logic blocks are merely illustrative and alternative embodiments may merge such blocks or impose an alternative decomposition of functionality of blocks. For example, threshold value 408 may be hardwired or otherwise stored in floating point unit 340, or threshold value 408 may be stored, for example, in processor status and control register 304 of CPU 300 and transmitted to floating point unit 340.

Furthermore, state control logic may be located within floating point unit 340 or may be located within CPU 300, for example, when CPU 300 and floating point unit 340 are integrated within the same microprocessor.

Also, alternate embodiments of data processing system 10 may include more, fewer, or different blocks of circuitry. For example, alternate embodiments of data processing system 10 may not have memory 14, timer 16, serial 18, or other circuitry 20. Some embodiments of the present invention may or may not have system integration circuitry 22. Some embodiments may combine multiple instances of a particular component.

The functionality described herein may be performed by or in any type of data processing system 10. For example, data processing system 10 may be or include any type of processing unit including but not limited to a microprocessor (e.g., a processing unit fabricated on a single integrated circuit chip), a microcontroller (e.g., a microprocessor including memory and/or I/O devices integrated therein), a computer system board, an embedded computer system and/or a general purpose computer system. Also, blocks of circuitry may include or be replaced by modules of software, or general purpose circuitry for execution of modules of software, or software for simulating such blocks of circuitry.

Furthermore, those skilled in the art will recognize that the boundaries between the functionality of the above described operations and decisions (e.g., FIGS. 5 and 6) described in the exemplary embodiment are for illustration only. Operations may be combined or the functionality of the operations may be distributed in additional operations in accordance with the invention. Moreover, alternative embodiments may include multiple instances of a particular operation or different sequencing of operations.

Some or all of the operations of FIGS. 5 and 6 may be executed by instructions or a module (e.g., a software module) or a portion of a module and/or a computer system user. Thus, the above described method, the operations thereof and any modules therefor may be executed on a computer system configured to execute the operations of the method and/or may be executed from machine-readable and/or computer-readable media. The method may be embodied in a computer-readable medium for configuring a computer system to execute the method. Thus, the software modules may be stored within and/or transmitted to a computer system memory to configure the computer system to perform the functions of the module.

The software modules, operations and/or instructions described herein may be received by data processing system 10, for example, from computer readable media such as memory 14. Computer readable media may be permanently, removably or remotely coupled to data processing system 10. Computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory/storage including semiconductor-based memory units such as FLASH memory, EEPROM, EPROM, ROM or application specific integrated circuits; volatile storage media including registers, buffers or caches, main memory, RAM, etc.; and data transmission media including computer network, point-to-point telecommunication, and carrier wave transmission media. The above exemplary computer readable media may take the form of or be accessible by memory 14, integrated circuit terminals 30, 32, 34, 36, 38, and/or buses 24, 26. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit software modules including the operations and decisions discussed herein.

In one embodiment, data processing system 10 is a computer system such as a personal computer system. Other embodiments may include different types of computer systems. Computer systems are information handling systems which can be designed to give independent computing power to one user or a plurality of users. Computer systems may be found in many forms including but not limited to mainframes, minicomputers, workstations, servers, personal computers, notepads and embedded systems. A typical computer system includes at least one processing unit, associated memory and a number of input/output (I/O) devices. Exemplary I/O devices include display monitors, keyboards, diskette drives, fixed disk storage devices, printers, modems, sound and video devices or specialized communication devices, computer readable media such as floppy or hard disk drives and CD-ROM drives. Many such computer systems use a system board to electrically connect these components together. A computer system processes information according to a program and produces resultant output information via the I/O devices. A program is a list of internally stored instructions such as a particular application program and/or an operating system. A software module may include a program. The programs that control the operation of a computer system are commonly referred to as software applications or simply software.

A signal may be or include voltage signal(s), current signal(s), status bit(s), or similar apparatus or circuit effect(s) for conveying the information of the signal. Many of the signals described herein are single-bit signals. Corresponding signals of other embodiments may be, for example, a multi-bit signal including a first bit or signal indicating assertion of the multi-bit signal and a second bit or signal indicating negation of the multi-bit signal.

Often, though not necessarily, the quantities or operations described herein require the manipulation of or take the form of electrical or magnetic signals capable of being stored, transferred, combined, compared, and otherwise manipulated. It proves convenient at times, principally for reasons of convention and common usage, to refer to these signals as bits, values, elements, symbols, characters, terms, numbers, or the like. It should be understood, however, that all of these and similar terms are to be associated with the appropriate physical features of the particular embodiment or embodiments thereof.

Those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the above described embodiment are characterized as transmitted from one block to the next, other embodiments may include modified signals in place of such directly transmitted signals as long as the informational and/or functional aspect of the signal is transmitted between blocks, To some extent, a signal input at a second logic block may be conceptualized as a second signal derived from a first signal output from a first logic block due to physical limitations of the circuitry involved (e.g., there will inevitably be some attenuation and delay). Therefore, as used herein, a signal transmitted between logic blocks is intended to include modifications resulting in a second signal, whether such modifications are due to circuit limitations or due to passage through other circuit elements, which do not change the informational and/or final functional aspect of the first signal.

The terms "assert" and "negate" are used herein when referring to the rendering of a signal into its logically true state or logically false state, respectively. If the logically true state is a logic level one, the logically false state will be a logic level zero, and vice versa. Some signals herein are asserted low (e.g., active low), and some signals herein are asserted high (e.g., active high). Other embodiments may reverse the polarities disclosed herein.

The term "bus" is used herein to refer to a plurality of signals or conductors which may be used to transfer one or more various types of information, such as data, addresses, control, or status. Other embodiments may, for example, use serial signals or single line connections in place of the aforementioned buses.

The above description is not intended to present an exhaustive list of embodiments of the invention. Although an attempt has been made to outline some exemplary embodiments and exemplary variations thereto, other embodiments and/or variations are within the scope of the invention as defined in the claims below.

What is claimed is:

1. A method of processing instructions by a processing device, the method comprising:

beginning execution of a multi-cycle processor instruction by the processing device; and during execution of the multi-cycle instruction, comparing a threshold value to a count value that indicates a number of remaining cycles before completion of the multi-cycle instruction, wherein the threshold value is less than a total number of cycles required to complete the multi-cycle instruction.

2. The method of claim 1 further comprising asserting a first signal based on a result of the step of comparing.

3. The method of claim 2, wherein the signal indicates when an interrupt of the multi-cycle instruction is permitted.

4. The method of claim 2 further comprising:

receiving an interrupt request signal; and aborting the execution of the multi-cycle instruction prior to completion when the first signal has been asserted.

5. The method of claim 2 further comprising storing an enable flag in a register of the processing device to indicate whether to assert the first signal.

6. The method of claim 2 further comprising storing the threshold value in a register within a central processing unit of the processing device prior to comparing the threshold value to the count value.

7. The method of claim 6 further comprising:

retrieving the threshold value from the register; and providing the threshold value to a floating point execution unit of the processing device.

8. The method of claim 1 further comprising storing an enable flag in a register of the processing device to indicate whether to perform the step of comparing the count value to the threshold value before completion of the multi-cycle instruction.

9. The method of claim 1, wherein the threshold value is programmable.

10. The method of claim 1 further comprising:

determining a number of cycles of the multi-cycle instruction; and counting cycles during execution of the multi-cycle instruction.

11. An apparatus comprising:

a processing unit including an interrupt control module, the interrupt control module having an interrupt request signal input and having a second input to receive a multi-cycle processor instruction interrupt signal to indicate whether the multi-cycle instruction is within an interruptible interval where an interrupt of the multi-cycle instruction is permitted prior to completion of the multi-cycle instruction.

12. The apparatus of claim 11, further comprising an execution unit coupled to provide the multi-cycle instruction interrupt signal to the interrupt control module, the execution unit being configured to process the multi-cycle instruction.

13. The apparatus of claim 12, wherein the multi-cycle instruction is a floating point arithmetic operation.

14. The apparatus of claim 11, wherein, after determining an interrupt request is pending, the processing unit aborts execution of the multi-cycle instruction when the multi-cycle instruction interrupt signal indicates that the interruption of the multi-cycle instruction is permitted.

15. The apparatus of claim 11, wherein the multi-cycle instruction interrupt signal further indicates whether the multi-cycle instruction is within a non-interruptible interval where an interrupt of the multi-cycle instruction is not permitted prior to completion of the multi-cycle instruction.

16. The apparatus of claim 11, wherein the processing unit asserts an abort signal responsive to determining that the multi-cycle instruction is within the interruptible interval.

17. The apparatus of claim 11, further comprising a floating point unit coupled to the processing unit, the floating point unit having an output to provide the multi-cycle instruction interrupt signal.

18. The apparatus of claim 17, wherein the floating point unit aborts execution of the multi-cycle instruction prior to completion in response to the processing unit asserting an abort signal.

19. The apparatus of claim 17, wherein the floating point unit comprises:

decode logic coupled to receive an instruction operation code;

a counter coupled to receive an instruction cycle count from the decode logic; and a comparator coupled to receive the counter and the threshold value.

20. The apparatus of claim 19, wherein the comparator is coupled to provide the multi-cycle instruction interrupt signal responsive to the counter and the threshold value.

21. The apparatus of claim 19, wherein the threshold value is stored in a register in the processing unit.

22. The apparatus of claim 11 further comprising:

a memory coupled to the processing unit; and input/output circuitry coupled to the processing unit and the memory.

23. The apparatus of claim 11, wherein the processing unit includes a register that contains an enable flag to enable the comparator before completion of the multi-cycle instruction.

24. A data processing system comprising an execution unit configured to process a multi-cycle processor instruction, the execution unit including:

decode logic to receive an instruction operation code;

a counter responsive to the decode logic to receive an instruction cycle count;

a threshold value; and a comparison unit responsive to the counter and to the threshold value, the comparison unit having an output to produce a multi-cycle instruction interrupt signal to indicate an interruptible interval when an interrupt of the multi-cycle instruction is permitted.

25. The data processing system of claim 24, wherein the multi-cycle instruction interrupt signal indicates that the multi-cycle instruction is to be completed prior to interruption.

26. The data processing system of claim 24 wherein the data processing system further comprises a processing unit including an interrupt controller, the interrupt controller being coupled to provide an abort signal to the execution unit in response to receiving an interrupt request and the multi-cycle instruction interrupt signal indicating the interruptible interval when the interrupt of the multi-cycle instruction is permitted.

27. A multi-cycle processor instruction for processing data, the multi-cycle instruction comprising:

a first execution interval; and a second execution interval, wherein the first execution interval and the second execution interval occur during an execution phase of the multi-cycle instruction; wherein the first execution interval permits interruption prior to completing execution of the multi-cycle instruction; and wherein the second execution interval does not permit interruption prior to completing execution of the multi-cycle instruction.

28. The multi-cycle instruction of claim 27 further comprising:

a third execution interval, the third execution interval providing an initialization interval of the multi-cycle instruction indicating completion of the third interval prior to interruption.

29. An apparatus including a signal, the signal comprising:

a first signal value to indicate during execution of a multi-cycle processor instruction that the multi-cycle instruction is at a first execution point where the multi-cycle instruction may be interrupted prior to completion; and a second signal value to indicate during execution of the multi-cycle instruction that the multi-cycle instruction is at a second execution point where the multi-cycle instruction is to be completed prior to interruption.

30. The apparatus of claim 29 further comprising:

a central processing unit; and a floating point unit coupled to provide the signal to the central processing unit.

31. The apparatus of claim 30 further comprising a microprocessor, the microprocessor including the central processing unit and the floating point unit.

32. The apparatus of claim 30 wherein the central processing unit is coupled to provide an abort signal to interrupt the floating point unit when an interrupt is pending in the central processing unit and the signal has the first signal value.

33. The apparatus of claim 32 further comprising a computer system, the computer system comprising:

the central processing unit;

the floating point unit; and a plurality of input/output devices coupled to the central processing unit.

34. The apparatus of claim 32 wherein the central processing unit includes a processor status and control storage location; and an interrupt controller, the interrupt controller being coupled to receive an interrupt request, the interrupt controller being coupled to receive status information from the processor status and control storage location, and the interrupt controller being coupled to provide the abort signal to the floating point unit; and the floating point unit includes a decoder coupled to receive an instruction opcode;

a counter coupled to receive an instruction cycle count value from the decoder, the instruction cycle count value being dependent upon the instruction opcode; and a comparator coupled to provide the signal to the central processing unit responsive to receiving a count from the counter and a threshold value.

35. The apparatus of claim 34 wherein the decoder is coupled to provide an instruction type signal to the comparator, the comparator performing a compare operation responsive to receiving the instruction type signal indicating the instruction opcode corresponds to an interruptible, multi-cycle instruction.

36. The apparatus of claim 29 wherein the signal comprises a first signal having the first signal value and a second signal having the second signal value.

37. The apparatus of claim 29 wherein the signal consists of a first signal alternately having the first signal value and the second signal value.

38. The apparatus of claim 29 wherein the first execution point is within an interruptible execution interval of the multi-cycle instruction; and the second execution point is within a post-interrupt threshold execution interval of the multi-cycle instruction.

39. The apparatus of claim 29 wherein the second signal value indicates that the multi-cycle processor instruction is at one of a second execution point and a third execution point, the second execution point being within a second execution interval of the multi-cycle instruction during which the multi-cycle instruction is to be completed prior to interruption, and the third execution point being within a third execution interval of the multi-cycle instruction during which the third execution interval is to be completed prior to interruption.

40. The apparatus of claim 29 further comprising:

a microprocessor; and a computer-readable medium coupled to the microprocessor, the computer-readable medium providing the signal.

41. The apparatus of claim 29 further comprising:

a microprocessor, the microprocessor including a computer-readable medium, the computer-readable medium providing the signal.

42. The apparatus of claim 29 further comprising:

a computer system, the computer system further including at least one processor including the signal; and a plurality of input/output devices coupled to the at least one processor.

* * * * *